Patented Feb. 11, 1941

2,231,148

UNITED STATES PATENT OFFICE 2,231,148

LUBRICANT

Jeffrey Hobart Bartlett, Cranford, N. J., assignor to Standard Oil Development Company, a corporation of Delaware No Drawing. Application October 14, 1938, Serial No. 234,963

10 Claims. (Cl. 252—52)

The present invention relates to improved lubricants, especially to oils of low pour point, and more specifically to waxy lubricating oils containing a new class of pour depressant. The invention will be fully understood from the following description.

It has been found that pour depressants can be prepared by the condensation of organic and especially fatty acid halides with lubricating oils. Heretofore, it has been proposed to condense aromatic hydrocarbons with acid halides, but such materials are weak pour depressants and have certain other undesirable characteristics such as are well known to those skilled in the art.

It has been found that superior pour depressants can be prepared by condensing acid halides with lubricating oils or extraction products thereof.

In making these new pour depressing compounds, the petroleum oil is condensed with an acid halide which may be of any desired type, but is preferably one obtained from a long chain aliphatic acid containing at least 10 carbon atoms. The naturally occurring fatty acids such as margaric, stearic or palmitic may be used, or the unsaturated acids such as oleic or various mixtures of saturated and unsaturated acids such as are obtained from natural fats or fatty oils can also be used. Acids made by partial oxidation of waxes such as paraffin wax, particularly deoiled petrolatum, make a good source of the acid halide.

In bringing about the reaction, the proportions of the ingredients are of some importance and it is preferable to provide a major proportion of the acid halide and a minor proportion of the petroleum lubricating oil. Ordinarily the proportion should be about 10 parts of the halide to one or two of the oil, but it is found that these proportions can be varied over a somewhat wider limit, for example, to about equal proportions, but as the amount of the acid halide is diminished from the preferred range, the pour depressants are found to be less effective.

The condensation is effected by means of catalysts of the active halide type such as aluminum chloride, zinc chloride, boron fluoride and the like, but aluminum chloride is believed to be the best. This may be added to the mixture of the acid halide and the oil and the amount of the catalyst may vary over a considerable range. It is found desirable to use about one molecular proportion of the catalyst to each mol of the acid halide, but less can be used, for example, as little as ¼ to ½ of this amount. The reaction takes place by gently heating and may be hastened by slightly raising the temperature. The reaction requires several hours at room temperatures but at 100° F. to 200° F. or higher, it is quite rapid and may be concluded in considerably less than one hour. The temperature should not be permitted to rise so high as to affect the decomposition, nor the reaction carried on for too long a time, as both of these conditions are apt to cause the formation of solid, rubbery materials. The catalyst sludge is preferably hydrolyzed either with water or alcohol and may be separated either by allowing the solid products of the hydrolysis of the catalytic material to settle or by extracting the oily constituents from the hydrolyzed product. These latter materials are distilled to about 500 or 600° F., in order to remove the easily vaporizable fractions and solvent, if such has been used during the reaction. The pour depressor or wax depressant is collected as a heavy residue.

Any type of lubricating oil may be used for the reaction whether derived from naphthenic or paraffinic crudes, and may be either a distillate or a residual stock. Little difficulty is encountered in using the distillate stocks, but where residuals are used, it is desirable to employ either those which are free from asphalt or which contain very small amounts thereof, or it is desirable to remove the asphalt. This may be readily done by precipitation with various solvents such as normally gaseous hydrocarbons or mixtures thereof.

The pour depressants obtained are of good color and are quite stable and freely soluble in mineral lubricating oils. They are ordinarily used in proportion from about ½ to 5%, but the optimum amount depends to some extent on the particular ingredients used, conditions of reaction and the nature of the oil to which the condensation product is added. These materials are also useful as wax modifiers in dewaxing processes. Their function appears to be to so change the crystal structure of the wax as to promote rapid chilling and rapid settling as well as promote a higher filtration rate.

The invention will be illustrated by the following example:

Example

To 100 grams of stearyl chloride were added 20 grams of Pennsylvania bright stock which had the following inspection:

| | |
|---|---|
| Gravity A. P. I. | 26.1° |
| Vis. @ 100° F | 2340 Saybolt sec. |
| Vis. @ 210° F | 147 Saybolt sec. |
| Pour point | 20° F. |

50 cc. of heavy naphtha were then added to act as a solvent and 45 grams of aluminum chloride were added while thoroughly stirring. The mixture was held at 100° F. for about one hour. Then the stirring was stopped and the mass was allowed to stand for 16 hours at room temperature. Isopropyl alcohol and hydrochloric acid were then added in relatively large volume so as to hydrolyze the catalyst sludge and the product separated into an oily layer and an aqueous layer. The oily layer was decanted and distilled up to about 560° F. 61 grams of a heavy residue, i. e. of viscous oil, were obtained.

2% of the residue obtained above was then added to a waxy neutral oil obtained from a Pennsylvania crude. The oil had an original pour point of 30° F. and it was observed that the blend had a pour point of —5° F.

The present invention is not to be limited by any theory of the manufacture of a pour depressant nor to any particular acid halide, catalyst or petroleum oil, but only to the following claims in which it is desired to claim all novelty.

I claim:

1. Composition of matter comprising a waxy mineral lubricating oil and a condensation product obtained by condensing at least 5 parts by weight of an aliphatic acid halide containing at least 10 carbon atoms in the molecule and 1 part by weight of a petroleum lubricating oil in the presence of an active halide condensing catalyst of the type of aluminum chloride, hydrolyzing and removing residual catalyst and distilling the reaction products to remove low-boiling constituents and to obtain the desired distillation residue.

2. Composition according to claim 1 in which the acid halide used is derived from acids made by partial oxidation of de-oiled petrolatum.

3. A composition of matter comprising a major proportion of waxy mineral lubricating oil and about 0.5%–5.0% of a pour depressor obtained by condensing at least 5 parts by weight of a saturated monobasic aliphatic acid halide containing at least 10 carbon atoms with 1 part by weight of petroleum lubricating oil, in the presence of an active halide condensation catalyst, at a temperature between the approximate limits of room temperature and 200° F., stopping the condensation before the production of solid rubbery products, hydrolyzing and removing residual catalyst, distilling the reaction products to remove low-boiling constituents and to obtain as distillation residue a viscous oil having pour depressing properties.

4. Composition according to claim 3 in which the condensation is carried out with about ¼ to 1 mol of aluminum chloride as catalyst per mol of aliphatic acid halide.

5. A lubricant comprising a major proportion of a waxy mineral lubricating oil and about 0.5%–5.0% of a pour depressor obtained by mixing about 100 parts by weight of stearyl chloride with about 20 parts by weight of Pennsylvania bright stock and heavy naphtha as a solvent, using about 50 ccs. of naphtha per 100 grams of stearyl chloride, adding 45 parts by weight of aluminum chloride while stirring, maintaining the mixture at about 100° F. for about 1 hour, hydrolyzing the catalyst sludge and separating the product into an oily layer and an aqueous layer, decanting the oily layer and distilling it up to about 560° F. to obtain the desired product as distillation residue.

6. Product according to claim 1 in which the condensation is effected by the use of aluminum chloride.

7. Product according to claim 1 in which the acid halide is obtained from a monobasic acid.

8. Product according to claim 1 in which the acid halide is obtained from a saturated monobasic aliphatic acid.

9. Composition of matter comprising a waxy lubricating oil and a condensation product of stearyl chloride and a Pennsylvania bright stock, the amount of stearyl chloride being from 5 to 10 times the amount of the lubricating oil used for the condensation product and the condensation being effected by catalysts of the aluminum chloride type followed by hydrolysis of the resulting catalyst sludge and separating solid products of the hydrolysis from the condensation product.

10. Composition according to claim 1 in which the petroleum oil used for producing the condensation product is a substantially asphalt-free residual oil.

JEFFREY HOBART BARTLETT.